Figure 1:
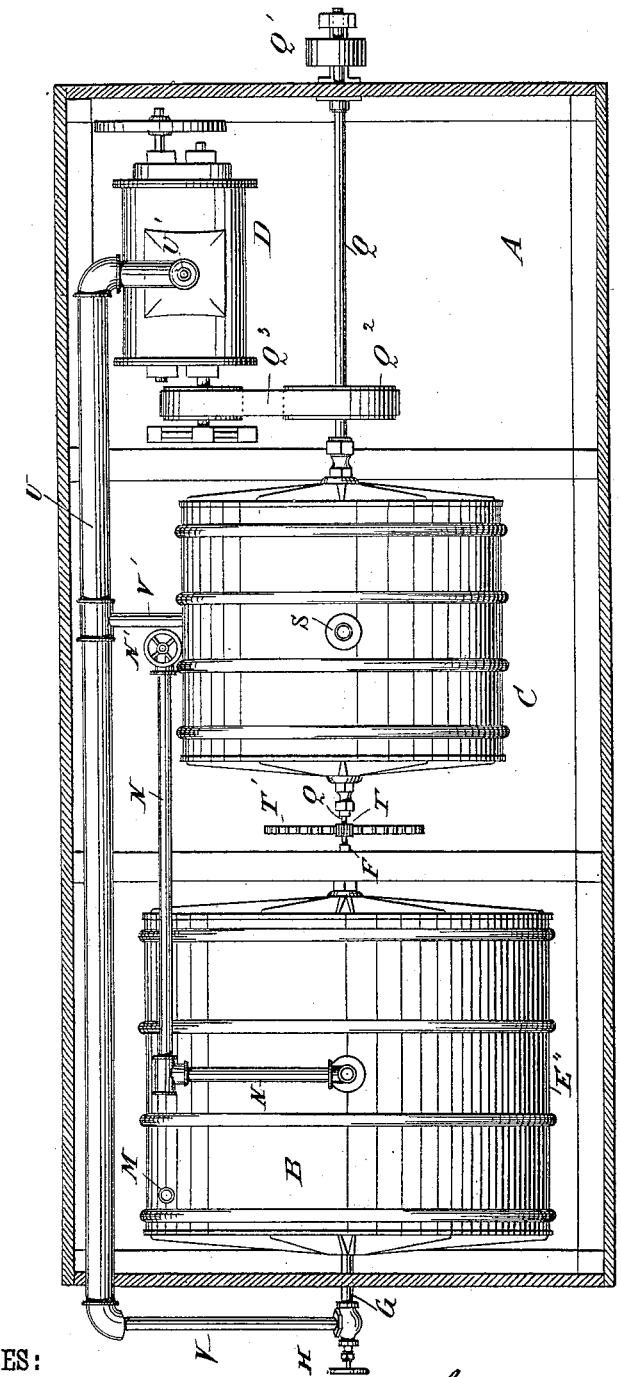

(No Model.) 5 Sheets—Sheet 1.

A. ORDONEZ Y PONCE.
GAS GENERATOR.

No. 360,240. Patented Mar. 29, 1887.

WITNESSES:
Chas. Nida
C. Sedgwick

INVENTOR:
Antonio Ordonez y Ponce
BY Munn & Co
ATTORNEYS.

(No Model.) 5 Sheets—Sheet 2.
A. ORDONEZ Y PONCE.
GAS GENERATOR.
No. 360,240. Patented Mar. 29, 1887.
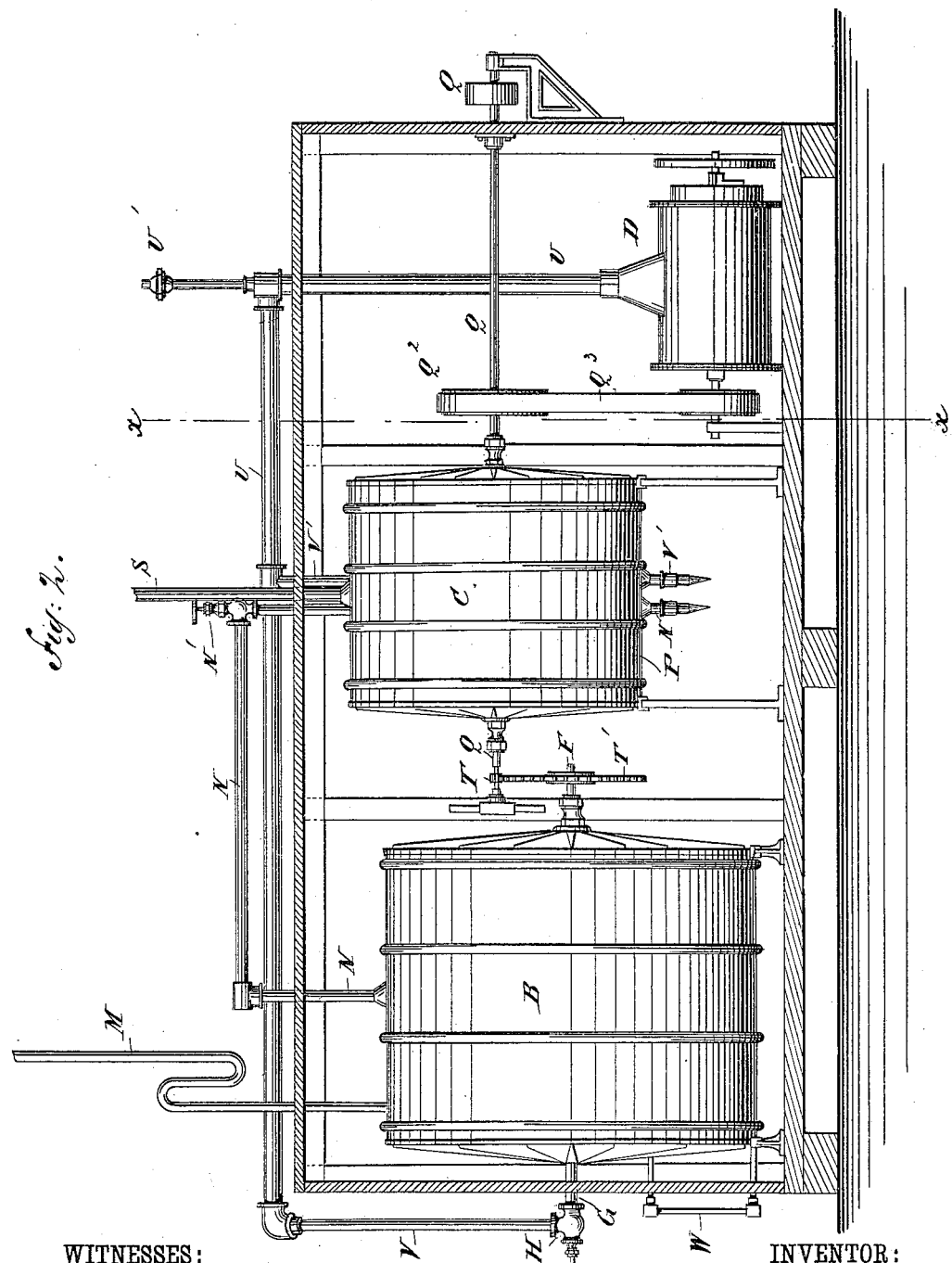
WITNESSES: INVENTOR:
Antonio Ordonez y Ponce
BY
ATTORNEYS.

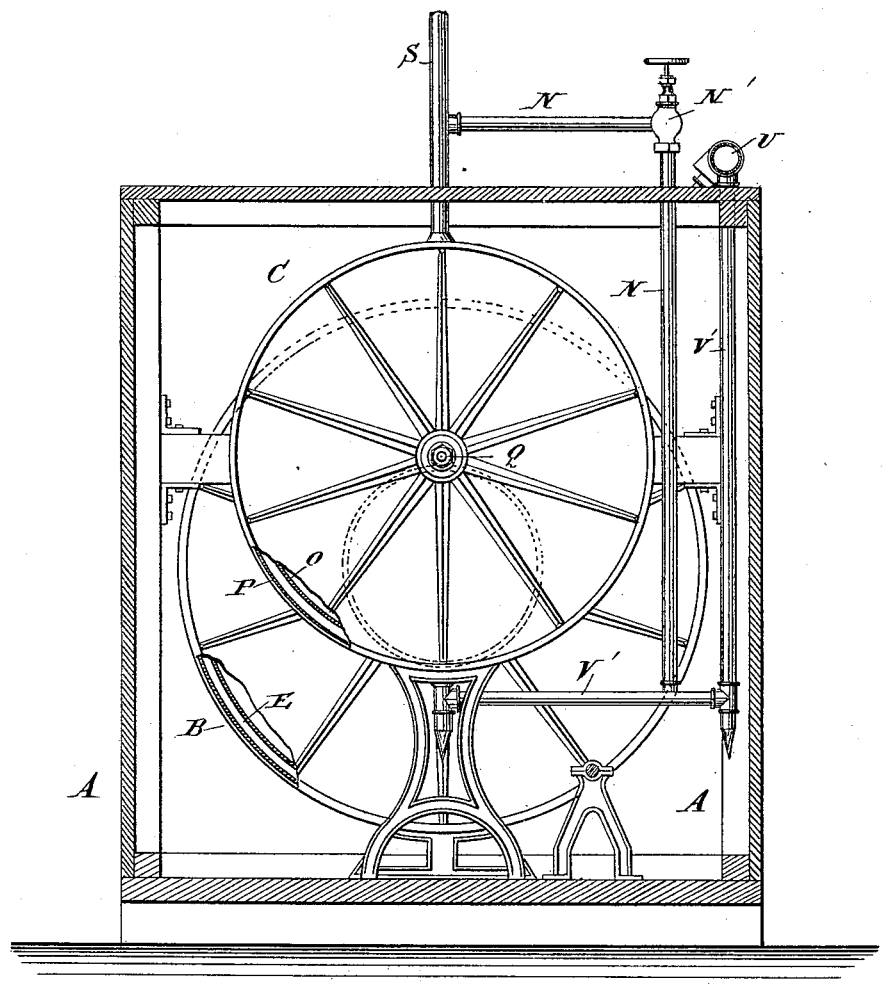

(No Model.) 5 Sheets—Sheet 4.
A. ORDONEZ Y PONCE.
GAS GENERATOR.
No. 360,240. Patented Mar. 29, 1887.
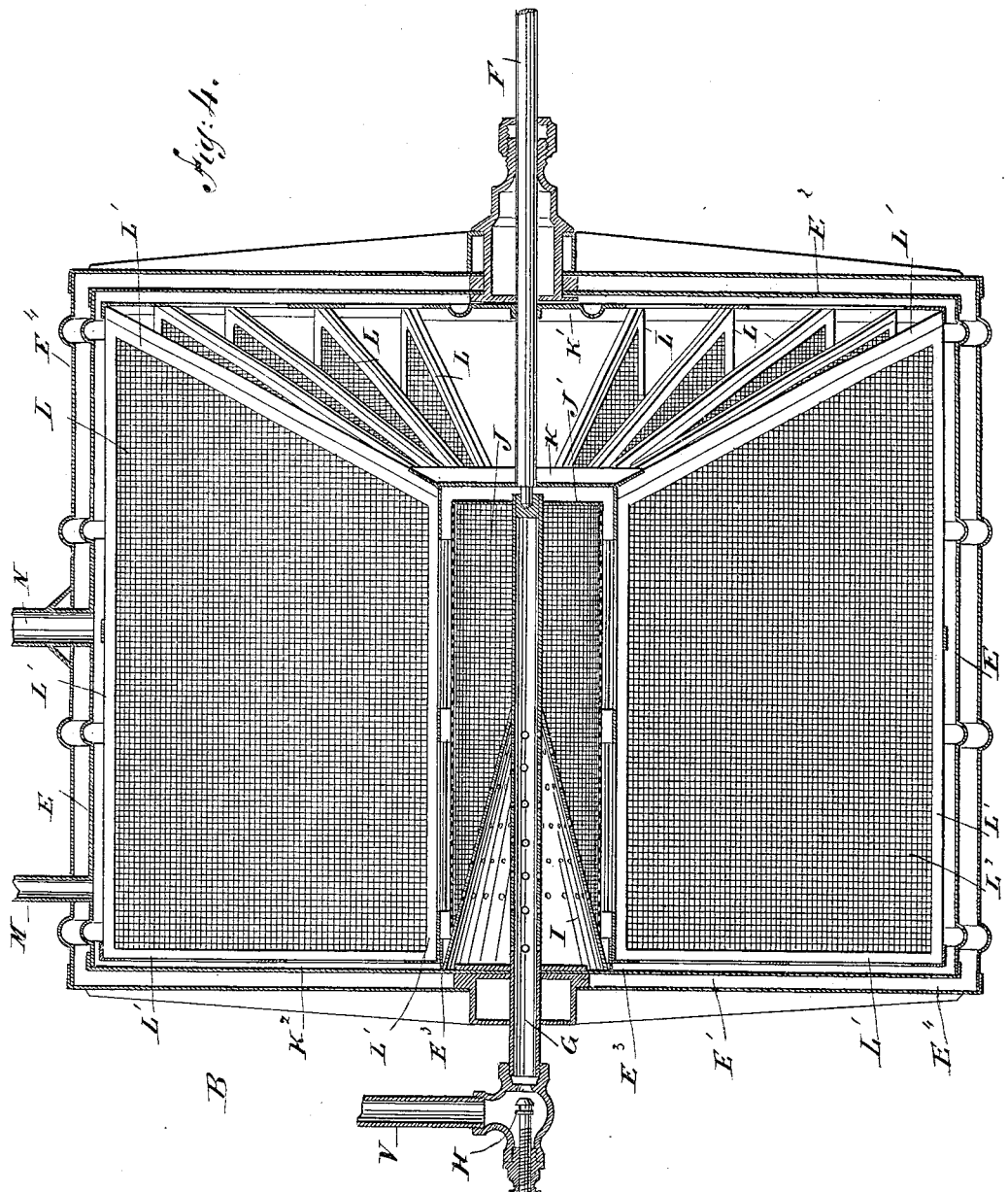
WITNESSES: INVENTOR:
Antonio Ordonez y Ponce
BY
ATTORNEYS.

(No Model.) 5 Sheets—Sheet 5.
A. ORDONEZ Y PONCE.
GAS GENERATOR.
No. 360,240. Patented Mar. 29, 1887.
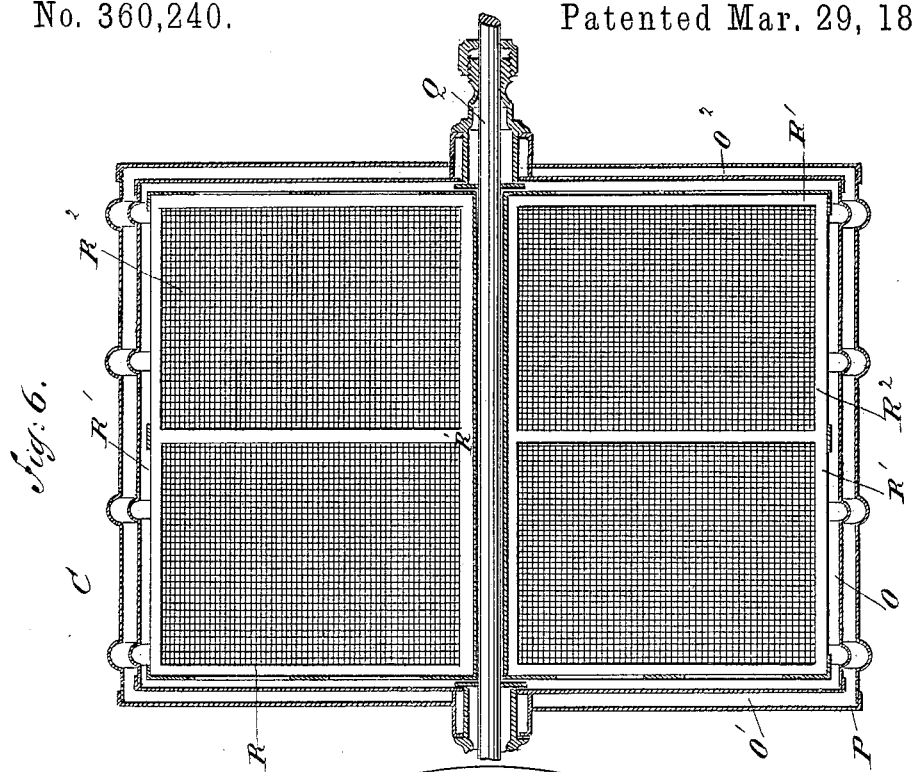
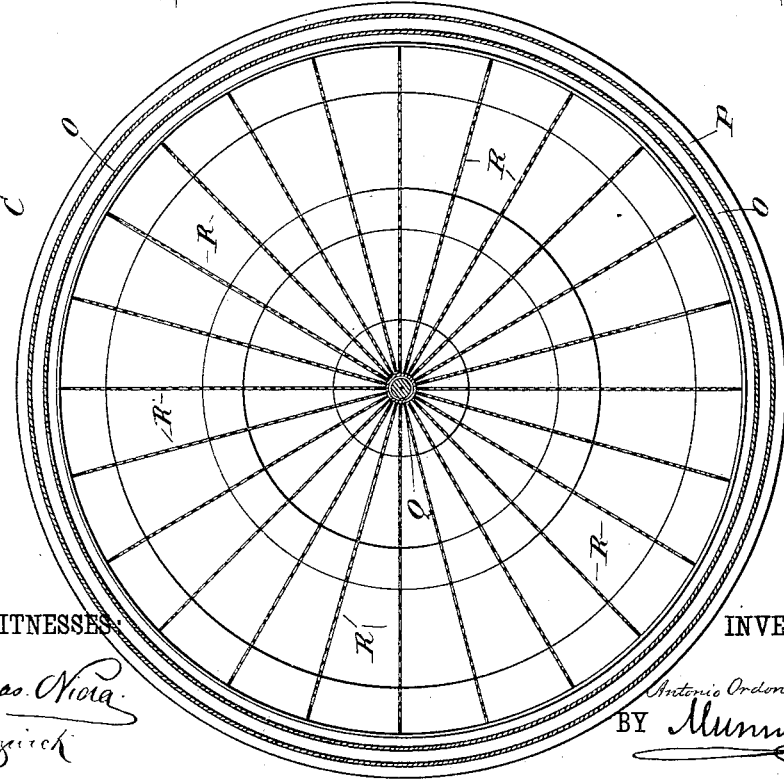

UNITED STATES PATENT OFFICE.

ANTONIO ORDONEZ Y PONCE, OF MATANZAS, CUBA.

GAS-GENERATOR.

SPECIFICATION forming part of Letters Patent No. 360,240, dated March 29, 1887.

Application filed June 29, 1886. Serial No. 206,604. (No model.)

*To all whom it may concern:*

Be it known that I, ANTONIO ORDONEZ Y PONCE, of the city of Matanzas, Cuba, residing in the city of Brooklyn, in the county of Kings and State of New York, have invented a new and Improved Hydro-Oxygen Carburetor, of which the following is a full, clear, and exact description.

The object of my invention is to provide a new and improved apparatus for mixing and making gas with hydrocarbons, which mixture is applicable to all purposes where a high or strong heat is required. In this apparatus a continual supply or current of fresh air is fed to the carbureted gas, thus producing a new mixture by which the hydrocarbon and the oxygen contained in the air form a perfect combination. It will be readily understood that said mixture cannot be used for illuminating purposes, because all the carbon is combined with the oxygen contained in the air, producing more heat and less brightness.

The invention consists of a gas preparatory cylinder having oblong screens, and connected with another cylinder, also provided with revolving screens which mix the gas and air, revolving under a high rate of speed. Said cylinders are each provided with a jacket, forming a space or chamber to which is supplied exhaust-steam, to prevent, in the preparatory mixing-cylinder, the freezing of the atmospheric air as it comes in contact with the hydrocarbon, and to increase in the mixing-cylinder the volume of gases for making a perfect mixture when the screens are in operation. This apparatus, operated by a small engine—say of two-horse power—will produce sufficient heat to generate steam for a boiler of one-hundred-horse power capacity, unattended by smoke, cinders, and ashes. Beginning the operation, the small engine works by its own steam until the boiler to which is connected the apparatus is ready for work, the steam being supplied directly to the small engine.

The invention also consists of various parts, details, and combinations of the same, as will be fully described hereinafter.

Reference is to be had to the accompanying drawings, forming a part of this specification, in which similar letters of reference indicate corresponding parts in all the figures.

Figure 1 is a plan view of my improvement, showing its supporting-frame in section. Fig. 2 is a front elevation of the same with the frame in section. Fig. 3 is a sectional end view of the same on the line $x\ x$, Fig. 2, parts being broken out. Fig. 4 is a longitudinal sectional elevation of the preparatory gas-generator. Fig. 5 is a sectional end view of the final gas-mixer. Fig. 6 is a longitudinal sectional elevation of the same.

The apparatus is mounted on a frame or casing, A, of suitable construction; and it consists, mainly, of the preparatory carburetor B, the final mixing apparatus C, and the fan D, which supplies the necessary atmospheric air.

The preparatory carburetor B (see Fig. 4) is provided with the stationary cylinder E, supported in any suitable manner in the frame A, and having the heads E' and E², of which the latter forms a suitable bearing for the shaft F, which extends centrally into the cylinder E, and has a bearing on its inner end in the stationary tube G, projecting through the head E', and provided on the inside of the cylinder E with perforations and at its outer end with an inlet-valve, H. The perforated cone I surrounds the perforated part of the tube G, and is supported at its base by the head E' and at its other end by the tube G. A perforated cylinder, J, surrounds the tube G and the cone I, and has a closed end, J'.

To the shaft F are attached two disks, K and K', which form a support for one end of the radial screens L, which are supported at their other ends by the disk K², having its bearing on an annular projection or ring, E³, formed on the inside of the head E'. Each radial screen L consists of a frame, L', covered by a wire-netting, L². A steam-jacket, E⁴, surrounds the cylinder E, and is provided with suitable inlet and outlet pipes for the exhaust-steam, which pipes are not shown. Into the cylinder E opens the bent inlet-pipe M, and another larger tube, N, provided with a valve, N', connects the top of the cylinder E with the final mixing apparatus C and enters into the same on the under side.

The mixer C, Figs. 5 and 6, is provided with a stationary cylinder, O, surrounded by a steam-jacket, P, and also provided with heads O' and O², which form a bearing for a shaft, Q, which passes centrally through the cylinder O, and carries and supports on suitable frames on the inside of the cylinder the rectangular screens R, each consisting of a frame, R', covered with wire-netting R². Into the top of the casing O opens the pipe S, which supplies the burners with the gas generated in the mixing apparatus C.

The shaft Q is provided on its left outer end with a pinion, T, which meshes into the gear-wheel T', secured on the shaft F of the preparatory generator B. On the other end of the shaft Q is secured a driving-pulley, Q', which rotates the shaft Q, and the latter imparts a similar motion by means of the pulley Q² and the belt Q³, or by other means, to the fan D, of any approved construction.

The fan is provided with a pipe, U, having a relief-valve, U', and connected by the branch pipe V with the valve H on the tube G, and also by a branch pipe, V', with the under side of the cylinder O of the final mixing apparatus C.

The operation is as follows: When the apparatus is in action, the driving-engine (not shown) communicates motion to the pulley Q' of the driving-shaft Q, and the exhaust-steam passes into the space or chamber formed between the cylinders E O and the jackets E⁴ P, heating the said cylinders. The cylinder E is charged with the required quantity of gasoline, which enters through the pipe M and settles in the bottom of the cylinder E, its level being indicated by the gage W. Through the tube G enters the atmospheric air supplied from the fan D and regulated by the valve H. As soon as the shaft F is rotated from the main shaft Q, by means of the pinion T and the gear-wheel T', the rotation of the screens L, passing through the gasoline in the bottom of the cylinder E, agitates the gasoline so as to generate a gas, which is mixed with the atmospheric air supplied by the pipe G. The atmospheric air is equally distributed over the entire surface of the screens L by the perforated cone I and the perforated cylinder J. The gas thus generated in the cylinder E passes from the same to the final mixing apparatus C by means of the pipe N, and the quantity of gas admitted to the cylinder O of the mixer C is regulated by the valve N'. The screens R in the cylinder O rotate at a high rate of speed, and the gas from the preparatory generator B is again thoroughly mixed with a fresh supply of atmospheric air supplied from the fan D, and entering the cylinder at its under side by the branch pipe V', which is placed in close proximity to the entering part of the pipe N, which supplies the gas. The gas generated in this cylinder O is supplied to the burners from the top of the said cylinder by means of a pipe, S.

It will be seen that the gases generated in both cylinders are heated by the exhaust-steam surrounding the said cylinders. Any other means may be employed, however, for heating the said cylinders.

In case other gas can be supplied, I dispense with the preparatory generator B altogether, and connect the cylinder O directly with the pipes N.

I am aware that it is not new to employ two revolving drums (one for air and the other for another gas) arranged within a mixing-chamber; to employ in connection with a generator means for heating the same, the same comprising a circular perforated pipe or burner arranged around the generator and connecting by pipe with the gas-mixing chamber; to employ in a cylinder a central rotary shaft passing through a series of hoppers and carrying a series of woven-wire dashers to conduct the air or blast into the preparatory revolving chamber and from thence into the mixing-chamber, and to employ at the inner end of the outlet-pipe of the inner chamber a perforated cone arranged within a surrounding cone traversed by a series of tubes, each communicating with the interior of the apparatus and with the surrounding or outer cone through a series of apertures or perforations in said outer or surrounding cone.

Having thus described my invention, what I claim as new, and desire to secure by Letters Patent, is—

1. The combination, in a carburetor, with a preparatory cylinder or receptacle provided with a jacket and revolving screens, of a second cylinder or receptacle, also provided with a jacket and revolving screens, together with the oil-supply and steam pipes and the fan with its blast-conducting pipe, substantially as described.

2. In a carbureting apparatus, the combination, with the preparatory and mixing cylinders or chambers, of the oil-supply and steam pipes and the fan and blast conducting pipe provided with branch pipes, one connecting with the preparatory chamber or cylinder and the other connecting with the mixing chamber or cylinder for feeding each of said cylinders or chambers with a supply of unmixed or pure atmospheric air, substantially as and for the purpose set forth.

3. A carbureting apparatus in which the vapors of gasoline and atmospheric air are thoroughly mixed, in combination with a final mixing apparatus in which the gases of the preparatory generator are again thoroughly mixed with a fresh supply of atmospheric air, together with means for supplying the preparatory chamber with oil and steam and both said latter chamber or cylinder and the final gas-mixing apparatus with an air-blast, substantially as shown and described.

4. A preparatory carbureting apparatus provided with a jacketed stationary cylinder, in which revolves a shaft carrying radial screens, in combination with a final gas-mixing apparatus connected with the said preparatory gas-generator, and provided with the heated stationary cylinder in which revolves a shaft carrying radial screens, and means for driving or revolving the shaft, substantially as shown and described.

5. A preparatory carbureting apparatus in which the vapors of gasoline and atmospheric air are thoroughly mixed in a cylinder provided with a revolving shaft carrying radial screens, in combination with a final mixing apparatus in which the gas from the preparatory generator is again thoroughly mixed with a fresh supply of atmospheric air, and a cylinder provided with a revolving shaft carrying radial screens, and means for driving or revolving the shaft, substantially as shown and described.

6. In a carbureting apparatus, the stationary cylinder E, the perforated tube G, provided with the valve H, the perforated cone I, and the perforated cylinder J, in combination with the revolving shaft F, the disks K, K', and K², and the radial screens L, and means for driving or revolving the shaft, substantially as shown and described.

7. In a carbureting apparatus, the cylinder E, provided with the inlet-pipe M and the outlet-pipe N, the perforated stationary tube G, having a valve, H, the perforated cone I, and the perforated cylinder J, in combination with the rotating shaft F, the disks K and K', fastened to said shaft F, the disk K², having its bearing on the ring E³ of the cylinder E, and the radial screens L, attached to the disks K, K', and K², and means for driving or revolving the shaft, substantially as shown and described.

8. In a carbureting apparatus, the cylinder E, the shaft F, carrying the radial screens L, and the gear-wheel T', secured to the shaft F, in combination with the cylinder O, the shaft Q, carrying the radial screens R, and the pinion T, secured to said shaft Q, and means for driving or revolving the shaft, substantially as shown and described.

ANTONIO ORDONEZ Y PONCE.

Witnesses:
EDGAR TATE,
JAMES M. HENLEY.